United States Patent
Luo et al.

(10) Patent No.: US 12,226,903 B2
(45) Date of Patent: Feb. 18, 2025

(54) GAIT CONTROL METHOD, BIPED ROBOT, AND COMPUTER-READABLE STORAGE MEDIUM

(71) Applicant: UBTECH ROBOTICS CORP LTD, Shenzhen (CN)

(72) Inventors: Qiuyue Luo, Shenzhen (CN); Ligang Ge, Shenzhen (CN); Yizhang Liu, Shenzhen (CN); Chunyu Chen, Shenzhen (CN); Jie Bai, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 302 days.

(21) Appl. No.: 17/732,568

(22) Filed: Apr. 29, 2022

(65) Prior Publication Data

US 2023/0064815 A1 Mar. 2, 2023

(30) Foreign Application Priority Data

Sep. 2, 2021 (CN) .......................... 202111023763.4

(51) Int. Cl.
*B25J 9/16* (2006.01)
*B25J 13/08* (2006.01)
*B62D 57/032* (2006.01)

(52) U.S. Cl.
CPC ............ *B25J 9/163* (2013.01); *B25J 9/1664* (2013.01); *B25J 13/088* (2013.01); *B62D 57/032* (2013.01)

(58) Field of Classification Search
CPC ........ B25J 9/163; B25J 9/1664; B25J 13/088; B62D 57/032
See application file for complete search history.

(56) References Cited

U.S. PATENT DOCUMENTS

| 10,017,218 B1* | 7/2018 | Swilling | B25J 9/0006 |
| 10,081,098 B1* | 9/2018 | Nelson | B25J 19/02 |
| 2022/0274254 A1* | 9/2022 | Zheng | B62D 57/032 |

* cited by examiner

*Primary Examiner* — Jason Holloway
*Assistant Examiner* — Christopher A Buksa

(57) ABSTRACT

A method for controlling gait of a biped robot includes: collecting a lateral center of mass (CoM) speed and a lateral CoM position of the biped robot when the biped robot walks in place; calculating phase variables of virtual constraints corresponding to the CoM of the biped robot in a first phase and a second phase according to the lateral CoM speed and the lateral CoM position; constructing motion trajectory calculation equations for the biped robot based on the phase variables corresponding to the first phase and the second phase, respectively; and finding inverse solutions for joints of the biped robot using the motion trajectory calculation equations to obtain joint angles corresponding to each of the joints of the biped robot to realize gait control.

17 Claims, 3 Drawing Sheets

GAIT CONTROL METHOD, BIPED ROBOT, AND COMPUTER-READABLE STORAGE MEDIUM

CROSS REFERENCE TO RELATED APPLICATIONS

This application claims priority to Chinese Patent Application No. CN202111023763.4, filed Sep. 2, 2021, which is hereby incorporated by reference herein as if set forth in its entirety.

BACKGROUND

1. Technical Field

The present disclosure generally relates to biped robots, and particularly to a gait control method for a biped robot, a biped robot, and a computer-readable storage medium.

2. DESCRIPTION OF RELATED ART

Virtual constraints refer to using internal states of a robot instead of time to plan the trajectory of the controlled joints of the robot, and the internal states are called phase variables. In practical use, the use of the internal states of the robot instead of time to plan the trajectory of the controlled joints of the robot can make the robot respond to disturbances in real time, providing the robot with greater robustness.

However, when a biped robot walks in place, the center of mass of the robot oscillates between the two supporting legs. In this case, it is impossible to find a monotonically increasing or decreasing internal state within a cycle. Therefore, the construction of the phase variables is very difficult, and when the phase variables are non-monotonically varying, it will not be possible to use it in place of time for trajectory planning of the controlled joints.

Therefore, there is a need to provide a gait control method to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views. Obviously, the drawings in the following description are only some embodiments of the present disclosure. For those of ordinary skill in the art, other drawings can be obtained based on these drawings without creative labor.

DETAILED DESCRIPTION

Figure 1:
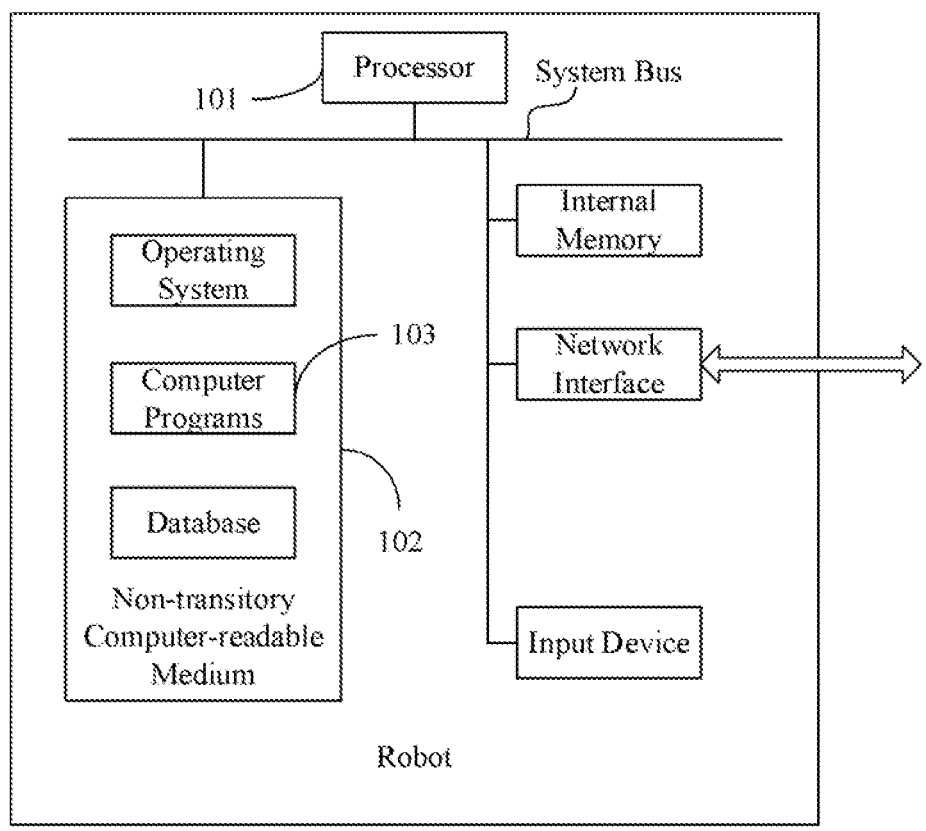
FIG. 1 is a schematic block diagram of a biped robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
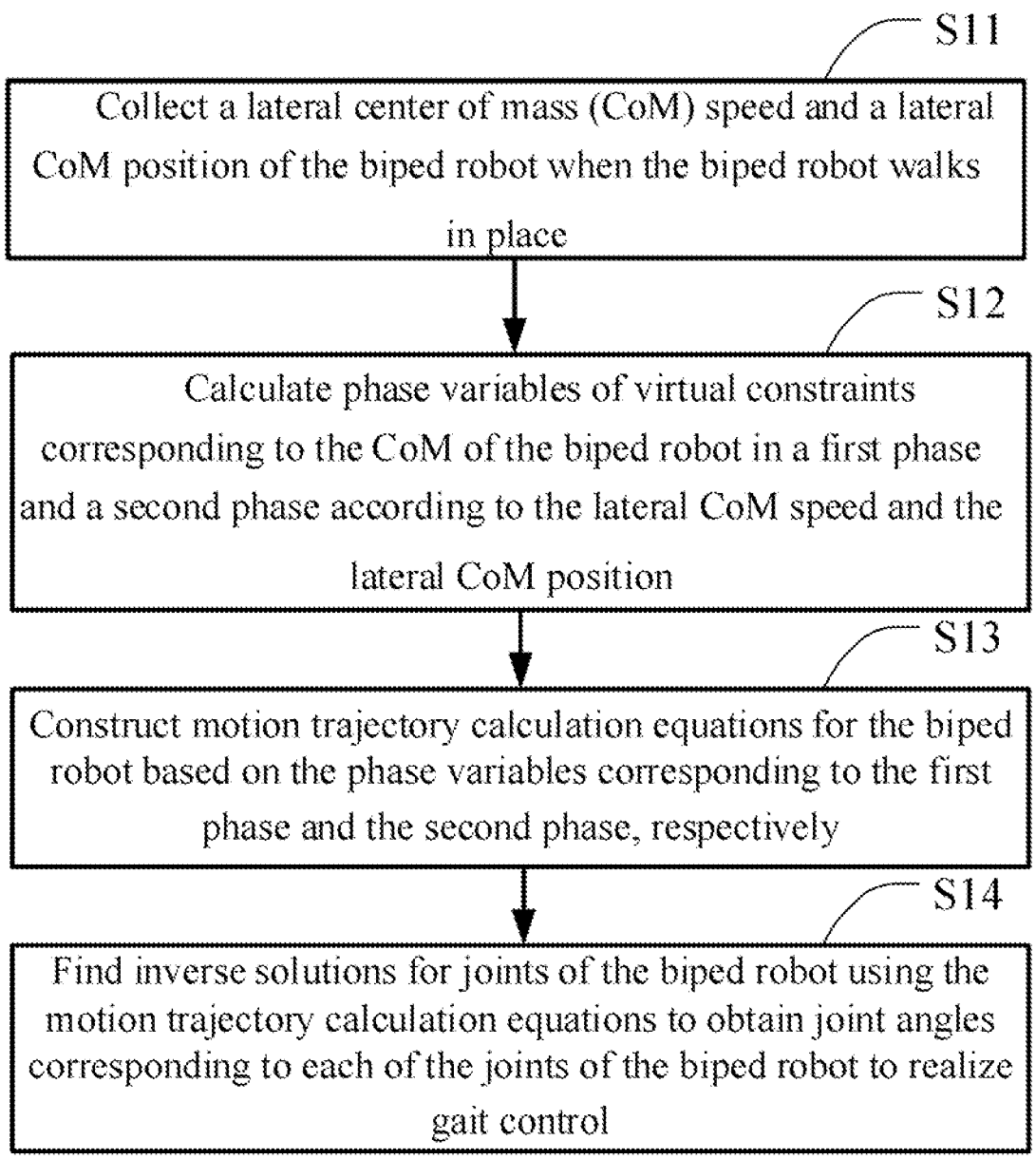
FIG. 2 is an exemplary flowchart of a gait control method for the biped robot according to one embodiment.

FIG. 1 shows a schematic block diagram of a biped robot according to one embodiment. The robot may include a processor 101, a storage 102, and one or more executable computer programs 103 that are stored in the storage 102. The processor 101 is electrically connected to the storage 105, and performs corresponding operations by executing the executable computer programs 103 stored in the storage 102. When the processor 101 executes the computer programs 103, the steps in the embodiments of the method for controlling the robot, such as steps S11 to S14 in FIG. 2 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robot, such as a hard disk or a memory. The storage 102 may also be an external storage device of the robot, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 3:
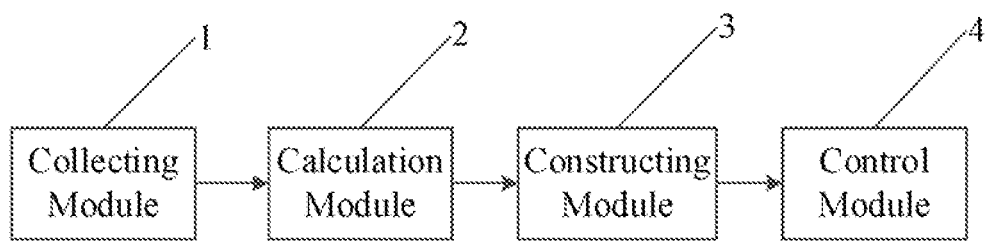
FIG. 3 is a schematic block diagram of a gait control device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot. For example, the one or more computer programs 112 may be divided into a collecting module, a calculation module, a constructing module, and a control module as shown in FIG. 3.

Referring to FIG. 2, in one embodiment, a gait control method for a biped robot may include the following steps S11 to S14.

Step S11: Collect a lateral center of mass (CoM) speed and a lateral CoM position of the biped robot when the biped robot walks in place. The lateral CoM speed is a speed of the CoM of the biped robot in a left-right oscillating direction, and the lateral CoM position is a position of the CoM of the biped robot in the left-right oscillating direction.

Step S12: Calculate phase variables of virtual constraints corresponding to the CoM of the biped robot in a first phase and a second phase according to the lateral CoM speed and the lateral CoM position. The first phase represents a phase in which the CoM of the biped robot moves from a position farthest from a support leg of the biped robot to a closest position, and the second phase represents a phase in which the CoM of the biped robot moves from the closest position from the support leg to the position farthest from the support leg.

Step S13: Construct motion trajectory calculation equations for the biped robot based on the phase variables corresponding to the first phase and the second phase, respectively.

Step S14: Find inverse solutions for joints of the biped robot using the motion trajectory calculation equations to obtain joint angles corresponding to each of the joints of the biped robot to realize gait control.

In one embodiment, collecting the lateral CoM speed and the lateral CoM position of the biped robot when the biped robot walks in place, may include the following steps.

Step S101: Establish a three-dimensional coordinate system when the biped robot walks in place, with a preset point on the support leg of the biped robot as an origin, wherein a positive x-axis of the three-dimensional coordinate system extends along a walking direction of the biped robot, a positive y-axis of the three-dimensional coordinate system extends horizontally from the support leg to a swinging leg of the biped robot, and a positive z-axis of the three-dimensional coordinate system extends up vertically. It should be noted that the biped robot stays in one spot while stepping in place alternating between both feet. Thus, the two legs of the biped robot alternately serve as the support leg when the biped robot walks in place. In one embodiment, two three-dimensional coordinate system established according to step S101 are symmetrical to each other.

Step S102: Collect the lateral CoM velocity and the lateral CoM position of the biped robot when the biped robot walks in place using the three-dimensional coordinate systems established on the support legs of the biped robot as a reference.

The biped robot moves along a preset motion path, and starts to walk in place when receiving a walk-in-place command input by the user. At the same time, the control system of the biped robot acquires the lateral speed and lateral position of the CoM of the biped robot in real time through its deployed sensors. The lateral speed is a speed of the CoM of the biped robot in a left-right oscillating direction, and the lateral position is a position of the CoM of the biped robot in the left-right oscillating direction. When using the linear inverted pendulum model to analyze the walking characteristics of the robot, it must be ensured that the center of mass does not move beyond the ankle of the support leg of the biped robot, so as to prevent the robot from falling to the outside of the support leg. When the biped robot is walking in place, the motion trajectory of the center of mass is not monotonic, but is a U-shaped trajectory. For the convenience of analysis, the control system takes the two supporting legs of the biped robot as origins, and establishes coordinate systems for the left and right feet. The two coordinate systems are symmetrical to each other. In the actual analysis, the origin of the coordinate system is always on the support leg, and the coordinate system of the swing leg is temporarily ignored. The positive x-axis of the coordinate system is the direction the biped robot faces. The positive y-axis of the coordinate system extends horizontally from the support leg to the swinging leg of the biped robot, and changes as the support leg changes. The positive z-axis of the coordinate system extends up vertically.

In the embodiment, the lateral position of the CoM is specifically the projection distance of the CoM relative to the origin of the coordinate system on the Y axis (that is, the y-coordinate of the CoM in the coordinate system). When the biped robot walks in place, the motion trajectory of the CoM is U-shaped, which is divided into a monotonical increasing phase and a monotonical decreasing phase. The control system determines whether the lateral speed of the CoM is less than a threshold (e.g., 0). If the lateral speed of the CoM is less than the threshold, the CoM is currently in the first phase (i.e., monotonical increasing phase), and the control system obtains the initial speed of the CoM of the biped robot, calculates the first phase variable of the virtual constraints according to the initial speed and the lateral speed of the CoM at the current moment. If the lateral speed of the CoM is not less than the threshold, the CoM is currently in the second phase (monotonical decreasing phase), and the control system obtains the step width of the biped robot and the initial position of the CoM (i.e., the y-coordinate of the CoM in the coordinate system), and calculates according to the step width, the initial position, and the lateral position of the CoM at the current moment to obtain the second phase variable of the virtual constraints.

Due to the symmetrical coordinate systems of the left and right feet, the lateral speed of the CoM is always negative in the first phase, and the lateral execution speed is always positive in the second stage. After completing the phase variable construction of the virtual constraints, the polynomial of the boundary conditions satisfied by the motion trajectory of the swinging leg (i.e., the raised leg of the biped robot) can be established based on the phase variables. The polynomial corresponding to the motion trajectory of the CoM in the first phase is a cubic polynomial, and the polynomial corresponding to the motion trajectory of the CoM in the second phase is a quintic polynomial. When the lateral speed of the CoM is less than the threshold, the control system calculates the first phase variable, and constructs a motion trajectory calculation equation characterizing the motion trajectory of the swing leg of the biped robot in the first phase according to the first phase variable and boundary conditions. When the lateral speed of the CoM is not less than the threshold, the control system calculates the second phase variable, and constructs the motion trajectory calculation equation characterizing the motion trajectory of the swing leg of the biped robot in the second phase according to the second phase variable and boundary conditions. The motion trajectory calculation equation can calculate the height (i.e., the z-coordinate of the CoM in the coordinate system) of the swinging leg of the biped robot according to the phase variables of the virtual constraints.

According to the principle of inverse kinematics, the control system calculates the corresponding bending angles of each joint on the swinging leg and support leg of the biped robot when the biped robot is walking in place by finding the joint inverse solutions to the motion trajectory calculation equation, so that the biped robot can walk in place according to the motion trajectory, and realize the gait control of the robot.

In the embodiment, the control system uses the phase variables to construct virtual constraints at different phases based on the state of the CoM (i.e., the lateral speed and the lateral position of the CoM) of the biped robot, and constructs a calculation equation to characterize the motion trajectory of the swinging leg of the biped robot in different phases based on the phase variables, so that the joint angles corresponding to the motion trajectory of each joint of the two feet of the robot are obtained by the inverse solutions of the joints, so as to realize the gait control of the robot. Since the phase variables based on the state of the CoM is used instead of time to plan the motion trajectory of the robot, the robot no longer continues to follow the established motion trajectory after being disturbed. Instead, it adjusts its own gait according to the disturbance, which ensures the stability of the biped robot when it is walking in place.

In one embodiment, calculating phase variables of virtual constraints corresponding to the CoM of the biped robot in the first phase and the second phase according to the lateral CoM speed and the lateral CoM position, may include the following steps.

Step S201: Determine whether the lateral CoM speed is less than a threshold.

Step S202: In response to the lateral CoM speed being less than the threshold, acquire an initial speed of the CoM of the biped robot, and calculate a first phase variable corresponding to the first phase according to the initial speed and the lateral CoM speed.

Step S203: In response to the lateral CoM speed not being less than the threshold, acquire a step width of the biped robot and an initial position of the CoM, and calculate a second phase variable corresponding to the second phase according to the step width, the initial position and the lateral CoM position.

When the biped robot is walking in place, the motion trajectory of the center of mass is a non-monotonic U-shaped trajectory, and each of its two states can be divided into a monotonical increasing phase and a monotonical decreasing phase. The phase variables of the virtual constraints must satisfy the condition of monotonic change, so it needs to divide the motion process into two monotonic phases, and construct the phase variables of the virtual constraints corresponding to the two phases. The control system determines whether the lateral speed of the CoM is less than the threshold. If the lateral speed of the CoM is less than the threshold, the CoM is currently in the first phase (i.e., the process of the lateral speed of the CoM decreases from the initial speed to 0), and the CoM is moving from the farthest position from the support leg (the leg of the biped robot that is in contact with the support surface) to the nearest position. The control system obtains the initial speed of the CoM of the biped robot, and calculates the first phase variable (the first phase variable corresponds to the first stage) of the virtual constraints according to the initial speed and the lateral speed of the CoM at the current moment. If the lateral speed of the centroid is not less than the threshold, the CoM is currently in the second phase: the CoM is returning from the static state to the middle position of the legs, that is, the swinging leg is moving from the position closest to the support leg to the farthest position. The control system obtains the step width of the biped robot and the initial position of the CoM (i.e., the y-coordinate of the CoM in the coordinate system), calculates according to the step width, the initial position and the lateral position of the CoM at the current moment, and obtains the second phase variable of the virtual constraints (the second phase variable corresponds to the second phase).

In one embodiment, calculating the second phase variable corresponding to the second phase according to the step width, the initial position and the lateral CoM position, may include the following steps.

Step S204: Acquire a desired speed of the CoM and an actual speed of the CoM of the biped robot at a termination moment of each step.

Step S205: Calculate the second phase variable according to the step width, the initial position, the lateral CoM position, the desired speed of the CoM, and the actual speed of the CoM.

In one embodiment, calculating the second phase variable according to the step width, the initial position, the lateral CoM position, the desired speed of the CoM, and the actual speed of the CoM, may include the following steps.

Step S2051: Calculate a speed feedback term according to the following equation:

$$\delta l = kp \times (\dot{y}^d - \dot{y}^a),$$

where $\delta l$ represents the speed feedback term, kp represents a preset coefficient, $\dot{y}^d$ represents the desired speed of the CoM, and $\dot{y}^a$ represents the actual speed of the CoM.

Step S2052: Calculate the second phase variable according to the following equation:

$$\phi_2 = \frac{-y + y_{el}}{-\left(\frac{D}{2} + \delta l\right) + y_{el}},$$

where $\phi_2$ represents the second phase variable, D represents the step width, y represents the lateral CoM position, and $y_{el}$ represents the initial position.

In practical applications, the motion of the CoM may diverge due to model errors and early ground contact. In order to improve the accuracy, it needs to introduce speed feedback into the phase variables corresponding to the second phase. Specifically, the control system obtains the desired speed of the CoM and the actual speed of the CoM at the moment of termination of each step of the biped robot. Here, the moment of termination of each step of the biped robot refers to the moment when the swinging leg starts to comes into contact with the support surface (i.e., floor, ground, etc.), and both feet of the biped robot are in contact with the support surface when the biped robot is walking in place. Then, the control system substitutes the desired speed of the CoM and the actual velocity of the centroid into the following calculation equation:

$$\delta l = kp(\dot{y}^d - \dot{y}^a),$$

where $\delta l$ represents the speed feedback term, kp represents a preset coefficient, $\overline{y}^d$ represents the desired speed of the CoM, and represents the actual speed of the CoM. Then, the control system calculates according to the step width, the initial position of the CoM and the speed feedback term obtained according to the abovementioned calculation, and obtains the second phase variable corresponding to the second phase. The equation characterizing the second phase variable is as follows:

$$\phi_2 = \frac{-y + y_{el}}{-\left(\frac{D}{2} + \delta l\right) + y_{el}},$$

where $\phi_2$ represents the second phase variable, D represents the step width, y represents the lateral CoM position, and $y_{el}$ represents the initial position. The second phase variable corresponding to the second phase introduces velocity feedback. When the actual speed of the CoM is inconsistent with the desired speed of the CoM, the position of the CoM will be adjusted back and forth to converge to the desired speed.

In one embodiment, constructing the motion trajectory calculation equations for the biped robot based on the phase variables corresponding to the first phase and the second phase, may include the following steps.

Step S301: Retrieve boundary conditions satisfied by motion trajectories of the biped robot in the first phase and the second phase.

Step S301: Construct the motion trajectory calculation equations corresponding to the first phase and the second phase, respectively, according to the boundary conditions and the phase variables, using the first phase and the second phase as a pairing benchmark.

In one embodiment, constructing the motion trajectory calculation equations corresponding to the first phase and the second phase, respectively, according to the boundary conditions and the phase variables, using the first phase and the second phase as a pairing benchmark, may include the following steps.

Step S3021: In response to the lateral CoM speed being less than the threshold, according to the boundary condition satisfied by the motion trajectory of the first phase and the first phase variable, solve a polynomial of the motion trajectory of the first phase to obtain the motion trajectory calculation equation corresponding to the first phase, where the boundary condition satisfied by the motion trajectory of the first phase is expressed as follows:

$$z_s^d(0) = 0, z_s^d(1) = h_s, \dot{z}_s^d(0) = 0, \dot{z}_s^d(1) = 0,$$

the first phase variable is expressed as follows:

$$\phi_1 = \frac{-\dot{y} + \dot{y}^+}{\dot{y}^+},$$

the polynomial of the motion trajectory of the first phase is expressed as follows:

$$z_s = a_1\phi_1^3 + b_1\phi_1^2 + c_1\phi_1 + d_1, z_s^d$$

represents a desired height of a swinging leg of the biped robot, $\dot{z}_s^d$ represents a desired speed of the swinging leg of the biped robot, $h_2$ represents a largest height of the swinging leg of the biped robot, $\dot{y}$ represents the lateral CoM speed, $\dot{y}^+$ represents the initial speed, represents the first phase variable, $z_2$ represents an actual height of the swinging leg of the biped robot, $a_1$, $b_1$, $c_1$, and $d_1$ are constants that are obtained by solving according to the boundary condition satisfied by the motion trajectory of the first phase.

Step S3022: In response to the lateral CoM speed not being less than the threshold, according to the boundary condition satisfied by the motion trajectory of the second phase and the second phase variable, solve a polynomial of the motion trajectory of the second phase to obtain the motion trajectory calculation equation corresponding to the second phase, where the boundary condition satisfied by the motion trajectory of the second phase is expressed as follows:

$$z_d^s(0) = h_s, z_d^s(\phi_m) = h_m, z_d^s(1) = 0, \dot{z}_d^s(0) = 0, \dot{z}_d^s(\phi_m) = v_m, \dot{z}_d^s(1) = 0,$$

the second phase variable is expressed as follows:

$$\phi_2 = \frac{-y + y_{cl}}{-D/2 + y_{cl}},$$

the polynomial of the motion trajectory of the second phase is expressed as follows:

$$z_s = a_2\phi_2^5 + b_2\phi_2^4 + c_2\phi_2^3 + d_2\phi_2^2 + e\phi_2 + f, h_m$$

represents a preset transition height during terminal swing of the swinging leg, and $a_2$, $b_2$, $c_2$, and $d_2$ are constants that are obtained by solving according to the boundary condition satisfied by the motion trajectory of the second phase.

In the embodiment, the control system defines the polynomials of the motion trajectory of the swing leg, that is, the virtual constraint, according to the first phase variable corresponding to the first phase and the second phase variable corresponding to the second phase obtained by the above-mentioned calculation. Specifically, it needs to define a cubic polynomial of the boundary condition that the motion trajectory of the swing leg needs to satisfy in the first phase (that is, when the lateral speed of the CoM is less than the threshold), and a quintic polynomial of the boundary condition that the motion trajectory of the swing leg needs to meet in the second phase (that is, when the lateral speed of the CoM is not less than the threshold). The boundary condition that needs to be satisfied by the trajectory of the CoM in the first phase is as follows:

$$z_s^d(0) = 0, z_s^d(1) = h_s, \dot{z}_s^d(0) = 0, \dot{z}_s^d(1) = 0,$$

where $z_s^d$ represents a desired height of a swinging leg of the biped robot, $\dot{z}_s^d$ represents a desired speed of the swinging leg of the biped robot, k represents a largest height of the swinging leg of the biped robot, and its value is user-defined. The boundary condition that needs to be satisfied by the trajectory of the CoM in the second phase is as follows:

$$z_d^s(0) = h_s, z_d^s(\phi_m) = h_m, z_d^s(1) = 0, \dot{z}_d^s(0) = 0, \dot{z}_d^s(\phi_m) = v_m, \dot{z}_d^s(1) = 0,$$

where $h_s$ represents a preset transition height during terminal swing of the swinging leg, and its value is user-defined. Here, the terminal swing is the final phase of a gait cycle of the biped robot. During terminal swing, the swing leg swings back down, enabling the biped robot to take another step. According to the polynomials and phase variables corresponding to each phase, the control system constructs corresponding motion trajectory calculation equations of the swinging legs of the biped robot in each phase. Specifically, the first phase variable corresponding to the first phase is expressed as follows:

$$\phi_1 = \frac{-\dot{y} + \dot{y}^+}{\dot{y}^+},$$

where $\dot{y}$ represents the lateral CoM speed, $\bar{y}^+$ represents the initial speed of the CoM, $\phi_1$ represents the first phase variable. The polynomial of the motion trajectory of the first phase is expressed as follows:

$$z_s = a_1\phi_1^3 + b_1\phi_1^2 + c_1\phi_1 + d_1,$$

where $z_2$ represents an actual height of the swinging leg of the biped robot, $a_1$, $b_1$, $c_1$, and $d_1$ are constants that are obtained by solving by the control system according to the boundary condition satisfied by the motion trajectory of the CoM in the first phase. The second phase variable (without speed feedback being introduced) corresponding to the second phase is expressed as follows:

$$\phi_2 = \frac{-y + y_{el}}{-D/2 + y_{el}}.$$

The polynomial of the motion trajectory of the swinging leg in the second phase is expressed as follows:

$$z_s = a_2\phi_2^5 + b_2\phi_2^4 + c_2\phi_2^3 + d_2\phi_2^2 + e\phi_2 + f,$$

where $a_2$, $b_2$, $c_2$, and $d_2$ are constants that are obtained by solving by the control system according to the boundary condition satisfied by the motion trajectory of the CoM in the first phase.

In one embodiment, collecting the lateral CoM speed and the lateral CoM position of the biped robot when the biped robot walks in place may include the following steps.

Step S103: Monitor whether a walk-in-place command is received from a user.

Step S104: In response to the walk-in-place command being received, control the biped robot to walk in place, and collect the lateral CoM speed and the lateral CoM position of the biped robot.

In the embodiment, the biped robot may monitor whether other control commands are received from a user while walking along a determined path. After receiving the walk-in-place command, the control system controls the biped robot to stop walking along the determined path, and controls the biped robot to walk in place. During this process, the lateral speed and lateral position of the CoM of the biped robot are collected in real time, so as to construct the motion trajectory calculation equation and realize the gait control of the biped robot.

Referring to FIG. 3, in one embodiment, a gait control device for a biped robot may include a collecting module 1, a calculation module 2, a constructing module 3, and a control module 4.

The collecting module 1 is to collect a lateral center of mass (CoM) speed and a lateral CoM position of the biped robot when the biped robot walks in place. The lateral CoM speed is a speed of the CoM of the biped robot in a left-right oscillating direction, and the lateral CoM position is a position of the CoM of the biped robot in the left-right oscillating direction.

The calculation module 2 is to calculate phase variables of virtual constraints corresponding to the CoM of the biped robot in a first phase and a second phase according to the lateral CoM speed and the lateral CoM position. The first phase represents a phase in which the CoM of the biped robot moves from a position farthest from a support leg of the biped robot to a closest position, and the second phase represents a phase in which the CoM of the biped robot moves from the closest position from the support leg to the position farthest from the support leg.

The constructing module 3 is to construct motion trajectory calculation equations for the biped robot based on the phase variables corresponding to the first phase and the second phase, respectively.

The control module 4 is to find inverse solutions for joints of the biped robot using the motion trajectory calculation equations to obtain joint angles corresponding to each of the joints of the biped robot to realize gait control.

In one embodiment, the calculation module 2 may include a determining unit, a first calculation unit, and a second calculation unit. The determining unit is to determine whether the lateral CoM speed is less than a threshold. The first calculation unit is to, in response to the lateral CoM speed being less than the threshold, acquire an initial speed of the CoM of the biped robot, and calculate a first phase variable corresponding to the first phase according to the initial speed and the lateral CoM speed. The second calculation unit is to, in response to the lateral CoM speed not being less than the threshold, acquire a step width of the biped robot and an initial position of the CoM, and calculate a second phase variable corresponding to the second phase according to the step width, the initial position and the lateral CoM position.

In one embodiment, the calculation module 2 may further include an acquiring unit, and a third calculation unit. The acquiring unit is to acquire a desired speed of the CoM and an actual speed of the CoM of the biped robot at a termination moment of each step. The third calculation unit is to calculate the second phase variable according to the step width, the initial position, the lateral CoM position, the desired speed of the CoM, and the actual speed of the CoM.

In one embodiment, the third calculation unit may include a first calculation sub-unit and a second calculation sub-unit. The first calculation sub-unit is to calculate a speed feedback term according to the following equation:

$$\delta l = kp \times (\dot{y}^d - \dot{y}^a),$$

where $\delta l$ represents the speed feedback term, kp represents a preset coefficient, $\dot{y}^d$ represents the desired speed of the CoM, and $\dot{y}^a$ represents the actual speed of the CoM. The second calculation sub-unit is to calculate the second phase variable according to the following equation:

$$\phi_2 = \frac{-y + y_{el}}{-\left(\frac{D}{2} + \delta l\right) + y_{el}},$$

where $\phi_2$ represents the second phase variable, D represents the step width, y represents the lateral CoM position, and $y_{el}$ represents the initial position.

In one embodiment, the constructing module 3 may include a retrieving unit and a constructing unit. The retrieving unit is to retrieve boundary conditions satisfied by motion trajectories of the biped robot in the first phase and the second phase. The constructing unit is to construct the motion trajectory calculation equations corresponding to the first phase and the second phase, respectively, according to the boundary conditions and the phase variables, using the first phase and the second phase as a pairing benchmark.

In one embodiment, the constructing unit may include a first constructing sub-unit and a second constructing sub-unit. The first constructing sub-unit is to, in response to the lateral CoM speed being less than the threshold, according to the boundary condition satisfied by the motion trajectory of the first phase and the first phase variable, solve a polynomial of the motion trajectory of the first phase to obtain the motion trajectory calculation equation corresponding to the first phase, where the boundary condition satisfied by the motion trajectory of the first phase is expressed as follows:

$$z_s^d(0) = 0, z_s^d(1) = h_s, \dot{z}_s^d(0) = 0, \dot{z}_s^d(1) = 0,$$

the first phase variable is expressed as follows:

$$\phi_1 = \frac{-\dot{y} + \dot{y}^+}{\dot{y}^+},$$

the polynomial of the motion trajectory of the first phase is expressed as follows:

$$z_s = a_1\phi_1^3 + b_1\phi_1^2 + c_1\phi_1 + d_1, z_z^d$$

represents a desired height of a swinging leg of the biped robot, $\dot{z}_s^d$ represents a desired speed of the swinging leg of the biped robot, $h_s$ represents a largest height of the swinging leg of the biped robot, $\dot{y}$ represents the lateral CoM speed, $\dot{y}^+$ represents the initial speed. $\phi_1$ represents the first phase variable, $Z_2$ represents an actual height of the swinging leg of the biped robot, $a_1$, $b_1$, $c_1$, and $d_1$ are constants that are obtained by solving according to the boundary condition satisfied by the motion trajectory of the first phase.

The second constructing sub-unit is to, in response to the lateral CoM speed not being less than the threshold, according to the boundary condition satisfied by the motion trajectory of the second phase and the second phase variable, solve a polynomial of the motion trajectory of the second phase to obtain the motion trajectory calculation equation corresponding to the second phase, where the boundary condition satisfied by the motion trajectory of the second phase is expressed as follows:

$$z_d^s(0) = h_s, z_d^s(\phi_m) = h_m, z_d^s(1) = 0, \dot{z}_d^s(0) = 0, \dot{z}_d^s(\phi_m) = v_m, \dot{z}_d^s(1) = 0,$$

the second phase variable is expressed as follows:

$$\phi_2 = \frac{-y + y_{cl}}{-D/2 + y_{cl}},$$

the polynomial of the motion trajectory of the second phase is expressed as follows:

$$z_s = a_2\phi_2^5 + b_2\phi_2^4 + c_2\phi_2^3 + d_2\phi_2^2 + e\phi_2 + f, h_m$$

represents a preset transition height during terminal swing of the swinging leg, and $a_2$, $b_2$, $c_2$, and $d_2$ are constants that are obtained by solving according to the boundary condition satisfied by the motion trajectory of the second phase.

In one embodiment, the collecting module 1 may include an establishing unit and a first collecting unit. The establishing unit is to establish a three-dimensional coordinate system when the biped robot walks in place, with a preset point on the support leg of the biped robot as an origin. The positive x-axis of the three-dimensional coordinate system extends along a walking direction of the biped robot, the positive y-axis of the three-dimensional coordinate system extends horizontally from the support leg to a swinging leg of the biped robot, and the positive z-axis of the three-dimensional coordinate system extends up vertically. The first collecting unit is to collect the lateral CoM velocity and the lateral CoM position of the biped robot when the biped robot walks in place using the three-dimensional coordinate systems established on the support legs of the biped robot as a reference.

In one embodiment, the collecting module 1 may further include a monitoring unit and a second collecting unit. The monitoring unit is to monitor whether a walk-in-place command is received from a user. The second collecting unit is to, in response to the walk-in-place command being received, control the biped robot to walk in place, and collect the lateral CoM speed and the lateral CoM position of the biped robot.

The modules, units and subunits of the gait control device are used for correspondingly executing the steps in the above-mentioned gait control method, and the specific implementation process thereof will not be described in detail here.

With such configuration, the control system of the biped robot collects the lateral CoM speed and the lateral CoM position of the biped robot when the biped robot walks in place, and calculates phase variables of virtual constraints corresponding to the CoM of the biped robot in a first phase and a second phase according to the lateral CoM speed and the lateral CoM position. The first phase represents a phase in which the CoM of the biped robot moves from a position farthest from a support leg of the biped robot to a closest position, and the second phase represents a phase in which the CoM of the biped robot moves from the closest position from the support leg to the position farthest from the support leg. The control system constructs the motion trajectory calculation equations of the biped robot in different phases based on the phase variables corresponding to the first phase and the second phase, and finds inverse solutions for joints of the biped robot using the motion trajectory calculation equations to obtain joint angles corresponding to each of the joints of the biped robot to realize gait control. The control system uses the phase variables to construct virtual constraints at different phases based on the state of the CoM (i.e., the lateral speed and the lateral position of the CoM) of the biped robot, and constructs a calculation equation to characterize the motion trajectory of the CoM of the biped robot in different phases based on the phase variables, so that the joint angles corresponding to the motion trajectory of each joint of the two feet of the robot are obtained by the inverse solutions of the joints, so as to realize the gait control of the robot. Since the phase variables based on the state of the CoM is used instead of time to plan the motion trajectory of the robot, the robot no longer continues to follow the established motion trajectory after being disturbed. Instead, it adjusts its own gait according to the disturbance, which ensures the stability of the biped robot when it is walking in place.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for controlling gait of a biped robot, comprising:

collecting a lateral center of mass (CoM) speed and a lateral CoM position of the biped robot when the biped robot walks in place, wherein the lateral CoM speed is a speed of the CoM of the biped robot in a left-right oscillating direction, and the lateral CoM position is a position of the CoM of the biped robot in the left-right oscillating direction;

calculating phase variables of virtual constraints corresponding to the CoM of the biped robot in a first phase and a second phase according to the lateral CoM speed and the lateral CoM position, wherein the first phase represents a phase in which the CoM of the biped robot moves from a position farthest from a support leg of the biped robot to a closest position, and the second phase represents a phase in which the CoM of the biped robot moves from the closest position from the support leg to the position farthest from the support leg;

constructing motion trajectory calculation equations for the biped robot based on the phase variables corresponding to the first phase and the second phase, respectively; and finding inverse solutions for joints of the biped robot using the motion trajectory calculation equations to obtain joint angles corresponding to each of the joints of the biped robot to realize gait control;

wherein calculating phase variables of virtual constraints corresponding to the CoM of the biped robot in the first phase and the second phase according to the lateral CoM speed and the lateral CoM position, comprises:

determining whether the lateral CoM speed is less than a threshold;

in response to the lateral CoM speed being less than the threshold, acquiring an initial speed of the CoM of the biped robot, and calculating a first phase variable corresponding to the first phase according to the initial speed and the lateral CoM speed;

in response to the lateral CoM speed not being less than the threshold, acquiring a step width of the biped robot and an initial position of the CoM, and calculating a second phase variable corresponding to the second phase according to the step width, the initial position and the lateral CoM position;

wherein calculating the second phase variable corresponding to the second phase according to the step width, the initial position and the lateral CoM position, comprises:

acquiring a desired speed of the CoM and an actual speed of the CoM of the biped robot at a termination moment of each step; and calculating the second phase variable according to the step width, the initial position, the lateral CoM position, the desired speed of the CoM, and the actual speed of the CoM; and wherein calculating the second phase variable according to the step width, the initial position, the lateral CoM position, the desired speed of the CoM, and the actual speed of the CoM, comprises:

calculating a speed feedback term according to the following equation:

$$\delta l = kp \times (\dot{y}^d - \dot{y}^a),$$

where $\delta l$ represents the speed feedback term, kp represents a preset coefficient, $\dot{y}^d$ represents the desired speed of the CoM, and $\dot{y}^a$ represents the actual speed of the CoM; and calculating the second phase variable according to the following equation:

$$\phi_2 = \frac{-y + y_{el}}{-\left(\frac{D}{2} + \delta l\right) + y_{el}},$$

where $\phi_2$ represents the second phase variable, D represents the step width, y represents the lateral CoM position, and $y_{el}$ represents the initial position.

2. The method of claim 1, wherein constructing the motion trajectory calculation equations for the biped robot based on the phase variables corresponding to the first phase and the second phase, comprises:

retrieving boundary conditions satisfied by motion trajectories of the biped robot in the first phase and the second phase; and constructing the motion trajectory calculation equations corresponding to the first phase and the second phase, respectively, according to the boundary conditions and the phase variables, using the first phase and the second phase as a pairing benchmark.

3. The method of claim 2, wherein constructing the motion trajectory calculation equations corresponding to the first phase and the second phase, respectively, according to the boundary conditions and the phase variables, using the first phase and the second phase as a pairing benchmark, comprises:

in response to the lateral CoM speed being less than the threshold, according to the boundary condition satisfied by the motion trajectory of the first phase and the first phase variable, solving a polynomial of the motion trajectory of the first phase to obtain the motion trajectory calculation equation corresponding to the first phase, where the boundary condition satisfied by the motion trajectory of the first phase is expressed as follows:

$$z_s^d(0) = 0,\ z_s^d(1) = h_1,\ z_1^d(0) = 0,\ z_s^d(1) = 0,$$

the first phase variable is expressed as follows:

$$\phi_1 = \frac{-\dot{y} + \dot{y}^+}{\dot{y}^+},$$

the polynomial of the motion trajectory of the first phase is expressed as follows:

$$z_s = a_1\phi_1^3 + b_1\phi_1^2 + c_1\phi_1 + d_1,\ z_z^d$$

represents a desired height of a swinging leg of the biped robot, $\dot{z}_s^d$ represents a desired speed of the swinging leg of the biped robot, $h_s$ represents a largest height of the swinging leg of the biped robot, $\dot{y}$ represents the lateral CoM speed, $\dot{y}^+$ represents the initial speed, $\phi_1$ represents the first phase variable, $z_s$ represents an actual height of the swinging leg of the biped robot, $a_1$, $b_1$, $c_1$, and $d_1$ are constants that are obtained by solving according to the boundary condition satisfied by the motion trajectory of the first phase; and in response to the lateral CoM speed not being less than the threshold, according to the boundary condition satisfied by the motion trajectory of the second phase and the second phase variable, solving a polynomial of the motion trajectory of the second phase to obtain the motion trajectory calculation equation corresponding to the second phase, where the boundary condition satisfied by the motion trajectory of the second phase is expressed as follows:

$$z_d^s(0) = h_s, \, z_d^s(\phi_m) = h_m, \, z_d^s(1) = 0, \, \dot{z}_d^s(0) = 0, \, \dot{z}_d^s(\phi_m) = v_m, \, \dot{z}_d^s(1) = 0,$$

the second phase variable is expressed as follows:

$$\phi_2 = \frac{-y + y_{cl}}{-D/2 + y_{cl}},$$

the polynomial of the motion trajectory of the second phase is expressed as follows:

$$z_s = a_2\phi_2^5 + b_2\phi_2^4 + c_2\phi_2^3 + d_2\phi_2^2 + e\phi_2 + f, \, h_m$$

represents a preset transition height during terminal swing of the swinging leg, and $a_2$, $b_2$, $c_2$, and $d_2$ are constants that are obtained by solving according to the boundary condition satisfied by the motion trajectory of the second phase.

4. The method of claim 1, wherein collecting the lateral CoM speed and the lateral CoM position of the biped robot when the biped robot walks in place, comprises:

establishing a three-dimensional coordinate system when the biped robot walks in place, with a preset point on the support leg of the biped robot as an origin, wherein a positive x-axis of the three-dimensional coordinate system extends along a walking direction of the biped robot, a positive y-axis of the three-dimensional coordinate system extends horizontally from the support leg to a swinging leg of the biped robot, and a positive z-axis of the three-dimensional coordinate system extends up vertically; and collecting the lateral CoM velocity and the lateral CoM position of the biped robot when the biped robot walks in place using the three-dimensional coordinate systems established on the support legs of the biped robot as a reference.

5. A biped robot comprising:

one or more processors; and a memory coupled to the one or more processors, the memory storing programs that, when executed, cause the one or more processors to:

collect a lateral center of mass (CoM) speed and a lateral CoM position of the biped robot when the biped robot walks in place, wherein the lateral CoM speed is a speed of the CoM of the biped robot in a left-right oscillating direction, and the lateral CoM position is a position of the CoM of the biped robot in the left-right oscillating direction;

calculate phase variables of virtual constraints corresponding to the CoM of the biped robot in a first phase and a second phase according to the lateral CoM speed and the lateral CoM position, wherein the first phase represents a phase in which the CoM of the biped robot moves from a position farthest from a support leg of the biped robot to a closest position, and the second phase represents a phase in which the CoM of the biped robot moves from the closest position from the support leg to the position farthest from the support leg;

construct motion trajectory calculation equations for the biped robot based on the phase variables corresponding to the first phase and the second phase, respectively; and find inverse solutions for joints of the biped robot using the motion trajectory calculation equations to obtain joint angles corresponding to each of the joints of the biped robot to realize gait control;

wherein, to calculate phase variables of virtual constraints corresponding to the CoM of the biped robot in the first phase and the second phase according to the lateral CoM speed and the lateral CoM position, the programs that, when executed, further cause the one or more processors to:

determine whether the lateral CoM speed is less than a threshold;

in response to the lateral CoM speed being less than the threshold, acquire an initial speed of the CoM of the biped robot, and calculate a first phase variable corresponding to the first phase according to the initial speed and the lateral CoM speed;

in response to the lateral CoM speed not being less than the threshold, acquire a step width of the biped robot and an initial position of the CoM, and calculate a second phase variable corresponding to the second phase according to the step width, the initial position and the lateral CoM position; and wherein, to construct the motion trajectory calculation equations for the biped robot based on the phase variables corresponding to the first phase and the second phase, the programs that, when executed, further cause the one or more processors to:

retrieve boundary conditions satisfied by motion trajectories of the biped robot in the first phase and the second phase; and construct the motion trajectory calculation equations corresponding to the first phase and the second phase, respectively, according to the boundary conditions and the phase variables, using the first phase and the second phase as a pairing benchmark; and wherein, to construct the motion trajectory calculation equations corresponding to the first phase and the second phase, respectively, according to the boundary conditions and the phase variables, using the first phase and the second phase as a pairing benchmark, the programs that, when executed, further cause the one or more processors to:

in response to the lateral CoM speed being less than the threshold, according to the boundary condition satisfied by the motion trajectory of the first phase and the first phase variable, solve a polynomial of the motion trajectory of the first phase to obtain the motion trajectory calculation equation corresponding to the first phase, where the boundary condition satisfied by the motion trajectory of the first phase is expressed as follows:

$z_s^d(0) = 0, z_s^d(1) = h_s, \dot{z}_s^d(0) = 0, \dot{z}_s^d(1) = 0,$ the first phase variable is expressed as follows:

$$\phi_1 = \frac{-\dot{y} + \dot{y}^+}{\dot{y}^+},$$

the polynomial of the motion trajectory of the first phase is expressed as follows:

$$z_s = a_1\phi_1^3 + b_1\phi_1^2 + c_1\phi_1 + d_1, z_s^d$$

represents a desired height of a swinging leg of the biped robot, $\dot{z}_s^d$ represents a desired speed of the swinging leg of the biped robot, $h_s$ represents a largest height of the swinging leg of the biped robot, $\dot{y}$ represents the lateral CoM speed, $\dot{y}^+$ represents the initial speed, $\phi_1$ represents the first phase variable, $z_s$ represents an actual height of the swinging leg of the biped robot, $a_1$, $b_1$, $c_1$, and $d_1$ are constants that are obtained by solving according to the boundary condition satisfied by the motion trajectory of the first phase; and in response to the lateral CoM speed not being less than the threshold, according to the boundary condition satisfied by the motion trajectory of the second phase and the second phase variable, solve a polynomial of the motion trajectory of the second phase to obtain the motion trajectory calculation equation corresponding to the second phase, where the boundary condition satisfied by the motion trajectory of the second phase is expressed as follows:

$z_d^s(0) = h_s, z_d^s(\phi_m) = h_m, z_d^s(1) = 0, \dot{z}_d^s(0) = 0, \dot{z}_d^s(\phi_m) = v_m, \dot{z}_d^s(1) = 0,$ the second phase variable is expressed as follows:

$$\phi_2 = \frac{-y + y_{cl}}{-D/2 + y_{cl}},$$

the polynomial of the motion trajectory of the second phase is expressed as follows:

$$z_s = a_2\phi_2^5 + b_2\phi_2^4 + c_2\phi_2^3 + d_2\phi_2^2 + e\phi_2 + f, h_m$$

represents a preset transition height during terminal swing of the swinging leg, and $a_2$, $b_2$, $c_2$, and $d_2$ are constants that are obtained by solving according to the boundary condition satisfied by the motion trajectory of the second phase.

6. The biped robot of claim 5, wherein, to calculate the second phase variable corresponding to the second phase according to the step width, the initial position and the lateral CoM position, the programs that, when executed, further cause the one or more processors to:
acquire a desired speed of the CoM and an actual speed of the CoM of the biped robot at a termination moment of each step; and
calculate the second phase variable according to the step width, the initial position, the lateral CoM position, the desired speed of the CoM, and the actual speed of the CoM.

7. The biped robot of claim 6, wherein, to calculate the second phase variable according to the step width, the initial position, the lateral CoM position, the desired speed of the CoM, and the actual speed of the CoM, the programs that, when executed, further cause the one or more processors to:
calculate a speed feedback term according to the following equation:

$$\delta\dot{y} = kp \times (\dot{y}^d - \dot{y}^a),$$

where $\delta\dot{y}$ represents the speed feedback term, kp represents a preset coefficient, $\dot{y}^d$ represents the desired speed of the CoM, and $\dot{y}^a$ represents the actual speed of the CoM; and
calculate the second phase variable according to the following equation:

$$\phi_2 = \frac{-y + y_{cl}}{-\left(\frac{D}{2} + \delta\dot{y}\right) + y_{cl}},$$

where $\phi_2$ represents the second phase variable, D represents the step width, y represents the lateral CoM position, and $y_{cl}$ represents the initial position.

8. The biped robot of claim 5, wherein, to collect the lateral CoM speed and the lateral CoM position of the biped robot when the biped robot walks in place, the programs that, when executed, further cause the one or more processors to:
establish a three-dimensional coordinate system when the biped robot walks in place, with a preset point on the support leg of the biped robot as an origin, wherein a positive x-axis of the three-dimensional coordinate system extends along a walking direction of the biped robot, a positive y-axis of the three-dimensional coordinate system extends horizontally from the support leg to a swinging leg of the biped robot, and a positive z-axis of the three-dimensional coordinate system extends up vertically; and
collect the lateral CoM velocity and the lateral CoM position of the biped robot when the biped robot walks in place using the three-dimensional coordinate systems established on the support legs of the biped robot as a reference.

9. A non-transitory computer-readable medium storing instructions that, when executed by at least one processor, cause the at least one processor to perform a method for controlling gait of a biped robot, the method comprising:
in response to a walk-in-place command being received, controlling the biped robot to walk in place, wherein a motion trajectory of a center of mass (CoM) of the biped robot is U-shaped and is divided into a monotonical increasing phase and a monotonical decreasing phase when the biped robot walks in place;
collecting a lateral CoM speed and a lateral CoM position of the biped robot when the biped robot walks in place, wherein the lateral CoM speed is a speed of the CoM of the biped robot in a left-right oscillating direction, and the lateral CoM position is a position of the CoM of the biped robot in the left-right oscillating direction;

calculating phase variables of virtual constraints corresponding to the CoM of the biped robot in a first phase and a second phase according to the lateral CoM speed and the lateral CoM position, wherein the first phase represents a phase in which the CoM of the biped robot moves from a position farthest from a support leg of the biped robot to a closest position, and the second phase represents a phase in which the CoM of the biped robot moves from the closest position from the support leg to the position farthest from the support leg, and wherein the first phase is the monotonical increasing phase and the second phase is the monotonical decreasing phase;

constructing motion trajectory calculation equations for the biped robot based on the phase variables corresponding to the first phase and the second phase, respectively; and finding inverse solutions for joints of the biped robot using the motion trajectory calculation equations to obtain joint angles corresponding to each of the joints of the biped robot to realize gait control.

10. The non-transitory computer-readable medium of claim 9, wherein calculating phase variables of virtual constraints corresponding to the CoM of the biped robot in the first phase and the second phase according to the lateral CoM speed and the lateral CoM position, comprises:

determining whether the lateral CoM speed is less than a threshold;

in response to the lateral CoM speed being less than the threshold, acquiring an initial speed of the CoM of the biped robot, and calculating a first phase variable corresponding to the first phase according to the initial speed and the lateral CoM speed;

in response to the lateral CoM speed not being less than the threshold, acquiring a step width of the biped robot and an initial position of the CoM, and calculating a second phase variable corresponding to the second phase according to the step width, the initial position and the lateral CoM position.

11. The non-transitory computer-readable medium of claim 10, wherein calculating the second phase variable corresponding to the second phase according to the step width, the initial position and the lateral CoM position, comprises:

acquiring a desired speed of the CoM and an actual speed of the CoM of the biped robot at a termination moment of each step; and calculating the second phase variable according to the step width, the initial position, the lateral CoM position, the desired speed of the CoM, and the actual speed of the CoM.

12. The non-transitory computer-readable medium of claim 11, wherein calculating the second phase variable according to the step width, the initial position, the lateral CoM position, the desired speed of the CoM, and the actual speed of the CoM, comprises:

calculating a speed feedback term according to the following equation:

$$\delta \dot{y} = kp \times (\dot{y}^d - \dot{y}^a),$$

where $\delta \dot{y}$ represents the speed feedback term, kp represents a preset coefficient, $\dot{y}^d$ represents the desired speed of the CoM, $\dot{y}^a$ and represents the actual speed of the CoM; and calculating the second phase variable according to the following equation:

$$\phi_2 = \frac{-y + y_{el}}{-\left(\frac{D}{2} + \delta \dot{y}\right) + y_{el}},$$

where $\phi_2$ represents the second phase variable, D represents the step width, y represents the lateral CoM position, and $y_{el}$ represents the initial position.

13. The non-transitory computer-readable medium of claim 10, wherein constructing the motion trajectory calculation equations for the biped robot based on the phase variables corresponding to the first phase and the second phase, comprises:

retrieving boundary conditions satisfied by motion trajectories of the biped robot in the first phase and the second phase; and constructing the motion trajectory calculation equations corresponding to the first phase and the second phase, respectively, according to the boundary conditions and the phase variables, using the first phase and the second phase as a pairing benchmark.

14. The non-transitory computer-readable medium of claim 13 wherein constructing the motion trajectory calculation equations corresponding to the first phase and the second phase, respectively, according to the boundary conditions and the phase variables, using the first phase and the second phase as a pairing benchmark, comprises:

in response to the lateral CoM speed being less than the threshold, according to the boundary condition satisfied by the motion trajectory of the first phase and the first phase variable, solving a polynomial of the motion trajectory of the first phase to obtain the motion trajectory calculation equation corresponding to the first phase, where the boundary condition satisfied by the motion trajectory of the first phase is expressed as follows:

$$z_s^d(0) = 0, z_s^d(1) = h_s, \dot{z}_s^d(0) = 0, \dot{z}_s^d(1) = 0,$$

the first phase variable is expressed as follows:

$$\phi_1 = \frac{-\dot{y} + \dot{y}^+}{\dot{y}^+},$$

the polynomial of the motion trajectory of the first phase is expressed as follows:

$$z_s = a_1\phi_1^3 + b_1\phi_1^2 + c_1\phi_1 + d_1, z_s^d$$

represents a desired height of a swinging leg of the biped robot, $\dot{z}_s^d$ represents a desired speed of the swinging leg of the biped robot, $h_2$ represents a largest height of the swinging leg of the biped robot, $\dot{y}$ represents the lateral CoM speed, $\dot{y}^+$ represents the initial speed, $\phi_1$ represents the first phase variable, $z_s$ represents an actual height of the swinging leg of the biped robot, $a_1$, $b_1$, $c_1$, and $d_1$ are constants that are obtained by solving according to the boundary condition satisfied by the motion trajectory of the first phase; and in response to the lateral CoM speed not being less than the threshold, according to the boundary condition satisfied by the motion trajectory of the second phase and the second phase variable, solving a polynomial of the motion trajectory of the second phase to obtain the motion trajectory calculation equation corresponding to the second phase, where the boundary condition satisfied by the motion trajectory of the second phase is expressed as follows:

$$z_d^s(0) = h_s, z_d^s(\phi_m) = h_m, z_d^s(1) = 0, z_s^d() = 0, z_s^d(\phi_m) = v_m, z_s^d(1) = 0,$$

the second phase variable is expressed as follows:

$$\phi_2 = \frac{-y + y_{cl}}{-D/2 + y_{cl}},$$

the polynomial of the motion trajectory of the second phase is expressed as follows:

$$z_s = a_2\phi_2^5 + b_2\phi_2^4 + c_2\phi_2^3 + d_2\phi_2^2 + e\phi_2 + f, h_m$$

represents a preset transition height during terminal swing of the swinging leg, and $a_2$, $b_2$, $c_2$, and $d_2$ are constants that are obtained by solving according to the boundary condition satisfied by the motion trajectory of the second phase.

15. The non-transitory computer-readable medium of claim 10, wherein constructing the motion trajectory calculation equations for the biped robot based on the phase variables corresponding to the first phase and the second phase, comprises:

retrieving boundary conditions satisfied by motion trajectories of the biped robot in the first phase and the second phase, wherein the boundary condition satisfied by the motion trajectory of the first phase is different from the boundary condition satisfied by the motion trajectory of the second phase; and constructing the motion trajectory calculation equations corresponding to the first phase and the second phase, respectively, by expressing polynomials of the motion trajectories of the first phase and the second phase, according to the boundary conditions and the phase variables, using the first phase and the second phase as a pairing benchmark.

16. The non-transitory computer-readable medium of claim 15, wherein the polynomial of the motion trajectory of the first phase is a cubic polynomial, and the polynomial of the motion trajectory of the second phase is a quintic polynomial.

17. The non-transitory computer-readable medium of claim 9, wherein collecting the lateral CoM speed and the lateral CoM position of the biped robot when the biped robot walks in place, comprises:

establishing a three-dimensional coordinate system when the biped robot walks in place, with a preset point on the support leg of the biped robot as an origin, wherein a positive x-axis of the three-dimensional coordinate system extends along a walking direction of the biped robot, a positive y-axis of the three-dimensional coordinate system extends horizontally from the support leg to a swinging leg of the biped robot, and a positive z-axis of the three-dimensional coordinate system extends up vertically; and collecting the lateral CoM velocity and the lateral CoM position of the biped robot when the biped robot walks in place using the three-dimensional coordinate systems established on the support legs of the biped robot as a reference.

* * * * *